United States Patent
Huang

[11] Patent Number: 6,031,450
[45] Date of Patent: Feb. 29, 2000

[54] TIRE PRESSURE ALARM SYSTEM WITH CENTRIFUGAL FORCE-CONTROLLED POWER SWITCH

[76] Inventor: Tien-Tsai Huang, No. 4, Lane 30, Wu Chuan St., Pan Chiao City, Taipei, Taiwan

[21] Appl. No.: 09/243,434

[22] Filed: Feb. 3, 1999

[51] Int. Cl.[7] .................................................. B60C 23/00
[52] U.S. Cl. ..................... 340/442; 340/445; 340/447; 73/146.8; 116/34 R
[58] Field of Search .................................. 340/442, 438, 340/444, 445, 447; 73/146.2, 146.8; 116/34 R

[56] References Cited

U.S. PATENT DOCUMENTS

| | | | |
|---|---|---|---|
| 4,131,877 | 12/1978 | Stewart et al. | 340/445 |
| 4,311,985 | 1/1982 | Gee et al. | 340/447 |
| 4,531,112 | 7/1985 | Thomas | 340/447 |
| 4,695,823 | 9/1987 | Vernon | 340/447 |
| 4,909,074 | 3/1990 | Gerresheim et al. | 340/447 |
| 4,970,491 | 11/1990 | Saint et al. | 340/447 |
| 5,001,457 | 3/1991 | Wang | 340/447 |
| 5,061,917 | 10/1991 | Higgs et al. | 340/447 |
| 5,109,213 | 4/1992 | Williams | 340/447 |
| 5,285,189 | 2/1994 | Nowicki et al. | 340/447 |

*Primary Examiner*—Daryl Pope
*Attorney, Agent, or Firm*—Bacon & Thomas

[57] ABSTRACT

A tire pressure alarm system includes a tire pressure sensor and radio transmitter circuit, that detects the air pressure of a tire and sends the detected tire pressure value to a radio receiver and alarm circuit by radio transmission communication. A radio receiver and alarm circuit receives the radio signal from a tire pressure sensor and radio transmitter circuit having a tire pressure sensor and radio transmitter circuit that has a power supply circuit. The power supply circuit includes a power source and a power switch, and the power switch has first and second metal contacts respectively connected to the positive and negative terminals of the power source. A metal spring member has a fixed end connected to a first metal contact and a free end mounted with a metal weight and is spaced from a second metal contact. When the tire is rotated at a speed over a predetermined level, a centrifugal force is produced forcing the metal weight at the free end of the metal spring member to contact with the second metal contact. The power switch is switched on automatically and enables the tire pressure sensor and radio transmitter circuit to detect the tire pressure of the tire and sends the detected tire pressure value to the radio receiver and alarm circuit by radio transmission signals.

13 Claims, 11 Drawing Sheets

TIRE PRESSURE ALARM SYSTEM WITH CENTRIFUGAL FORCE-CONTROLLED POWER SWITCH

BACKGROUND OF THE INVENTION

The present invention relates to a tire pressure alarm system, and more specifically to an improved structure for a power switch in a power supply circuit for use in a tire pressure alarm system.

Tires are the "legs" of a vehicle. The tire pressure of the tires of a vehicle must be maintained within a certain range. Excessive high or low tire pressure may affect the movement of the vehicle. Various tire pressure alarm devices have been disclosed for use in monitoring the tire pressure of vehicle tires. Some mechanisms of conventional tire pressure alarm devices are complicated and less accurate. Other conventional tire pressure alarm devices disclose an electronic tire pressure alarm systems. However, a typical electronic type tire pressure alarm system consumes too much battery energy because it employs electronic pressure detection techniques and radio signal transmitting techniques to achieve detection of tire pressure and transmission of the detected signal. Because the electronic type tire pressure alarm system keeps consuming battery energy when the vehicle is stopped, the energy in the battery will be used up within a short period of time. When the energy of the battery is used up, it must be properly disposed of so as not to cause an environmental pollution.

SUMMARY OF THE INVENTION

It is one object of the present invention to provide an automatic power switch for a tire pressure alarm system which controls the operation of the power supply circuit of the tire pressure alarm system automatically. It is another object of the present invention to provide a power switch for a tire pressure alarm system which greatly saves the consumption of electric energy. The tire pressure alarm system comprises a tire pressure sensor and radio transmitter circuit and a radio receiver and alarm circuit. The tire pressure sensor and radio transmitter circuit detects the tire pressure of a vehicle tire, and sends the detected tire pressure value to the radio receiver and alarm circuit by radio, enabling the user to know the condition of the pressure of the vehicle tire through the radio receiver and alarm circuit. The present invention is characterized in that the tire pressure sensor and radio transmitter circuit has a power supply circuit, and the power supply circuit has a power source and a power switch. The power switch has two metal contacts, a metal spring member, and a weight. The metal contacts are respectively connected to the positive and negative terminals of the power source. The metal spring member has one end, namely the fixed end, connected to one metal contact, namely the first metal contact, and a second end, namely the free end, spaced from another metal contact, namely the second metal contact. The weight can be a metal ball, a metal nut, or any of a variety of electrically conductive metal elements connected in a fixed manner to the free end of the metal spring member. When the tire is rotated at a speed over a predetermined level, a centrifugal force is produced to force the weight at the free end of the metal spring member into contact with the second metal contact, causing the power switch to be switched on for enabling the tire pressure sensor and radio transmitter circuit to detect the tire pressure of the tire, and to send the detected tire pressure value to the radio receiver and alarm circuit by radio. When the vehicle is stopped, the power switch is automatically switched off to eliminate consumption of the power supply. When the vehicle is moving, the power switch is automatically switched on, causing the tire pressure sensor and radio transmitter circuit to work. Furthermore, the power switch may be equipped with adjustment means for adjusting the sensitivity of the system. According to one embodiment of the present invention, the adjustment means has a shield with a screw hole and an adjustment screw threaded in the screw hole on the shield and pressed on the metal spring member at a top side.

DETAILED DESCRIPTION OF THE PREFERRED EMBODIMENT

Figure 1A:
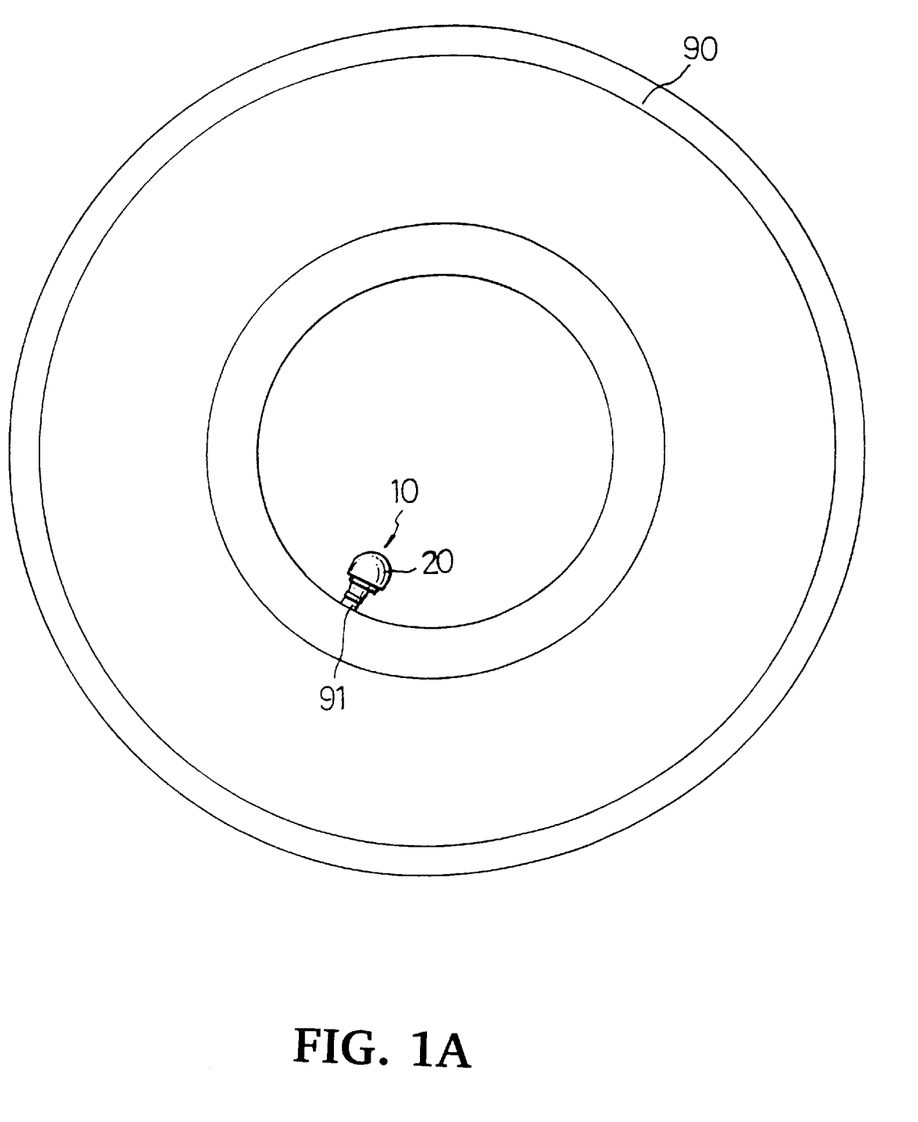
FIG. 1A illustrates the shell and tire pressure and alarm system installed in the air valve of a tire according to a first embodiment of the present invention.
Figure 1B:
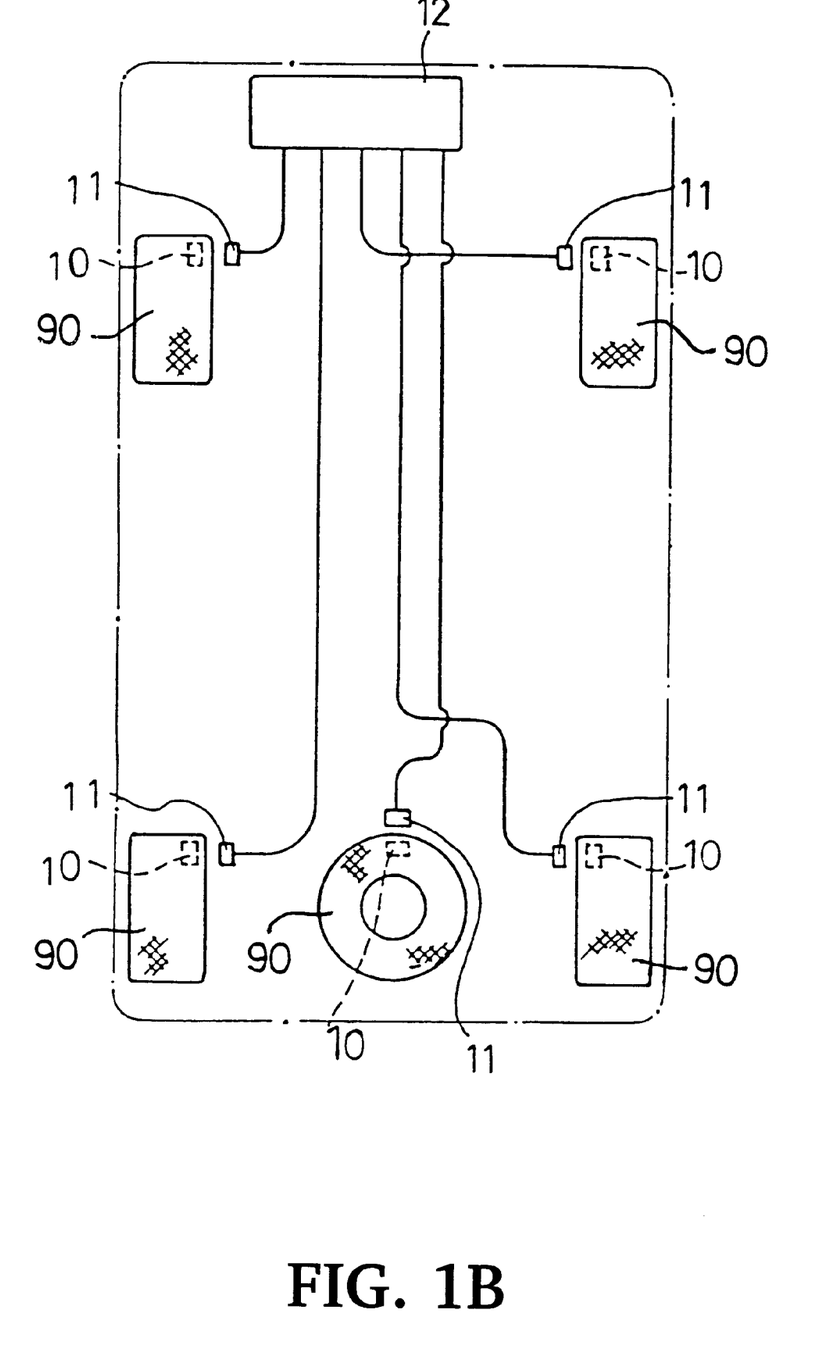
FIG. 1B illustrates the receiver and alarm circuit of the present invention.

Referring to FIGS. 1 through 4, a tire pressure alarm system 10 is shown comprised of a shell 20, a tire pressure sensor and radio transmitter circuit 30, and a radio receiver 11 and alarm circuit 12, as shown in FIG. 1B.

Figure 2:
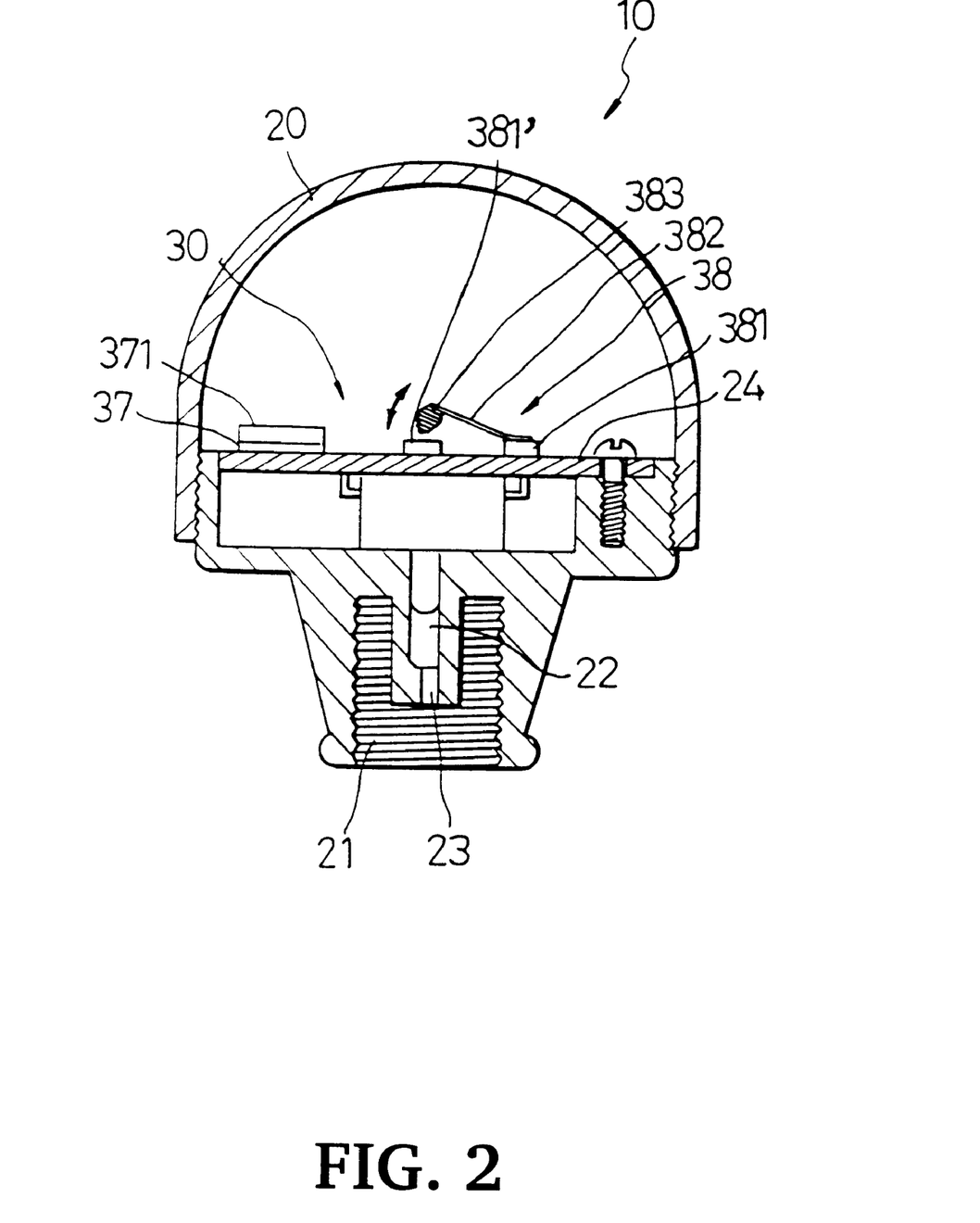
FIG. 2 is a sectional view of a part of the first embodiment of the present invention, showing the tire pressure sensor and radio transmitter circuit installed in the shell.
Figure 3:
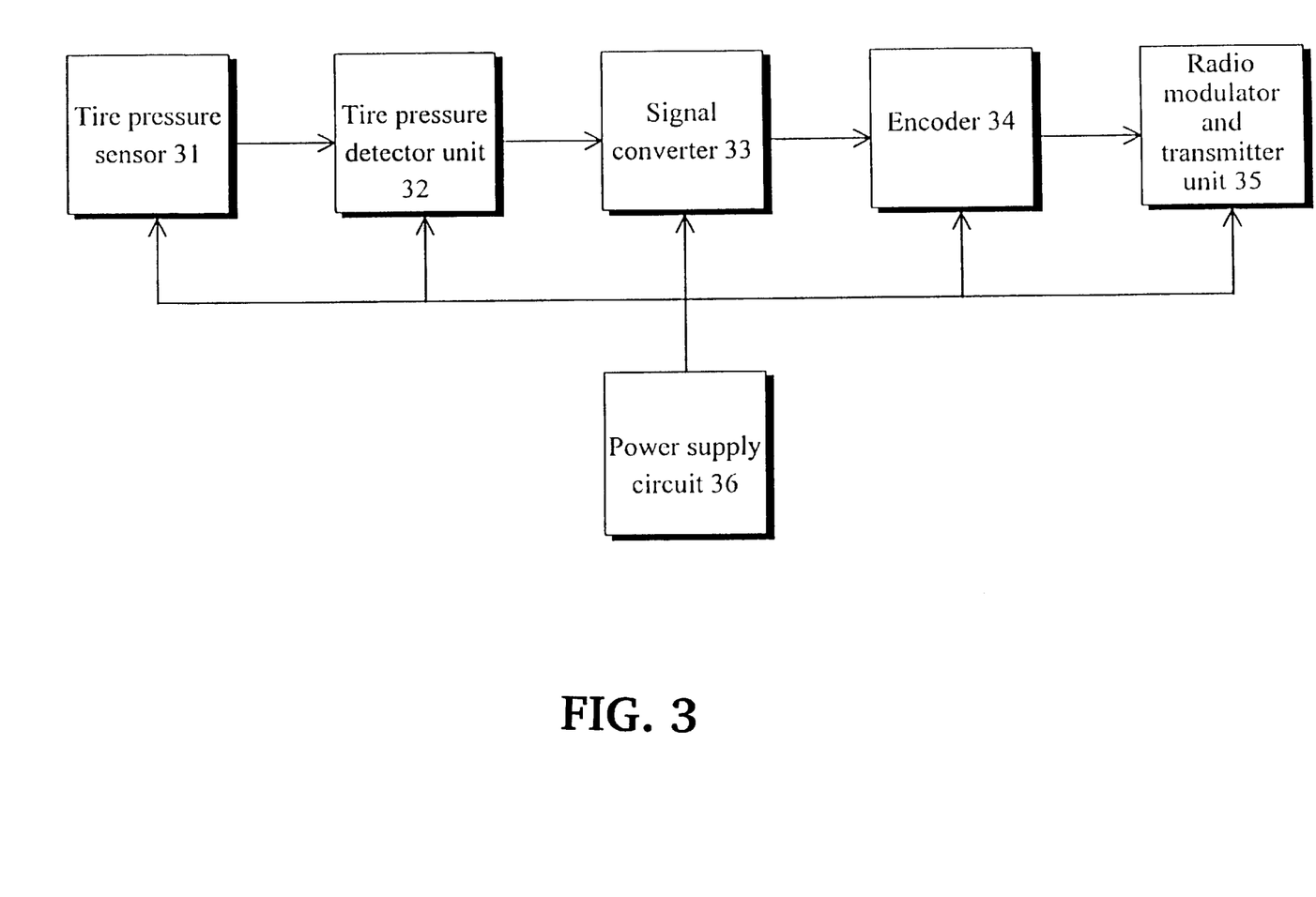
FIG. 3 is a circuit block diagram of the tire pressure sensor and radio transmitter circuit according to the first embodiment of the present invention.
Figure 4:
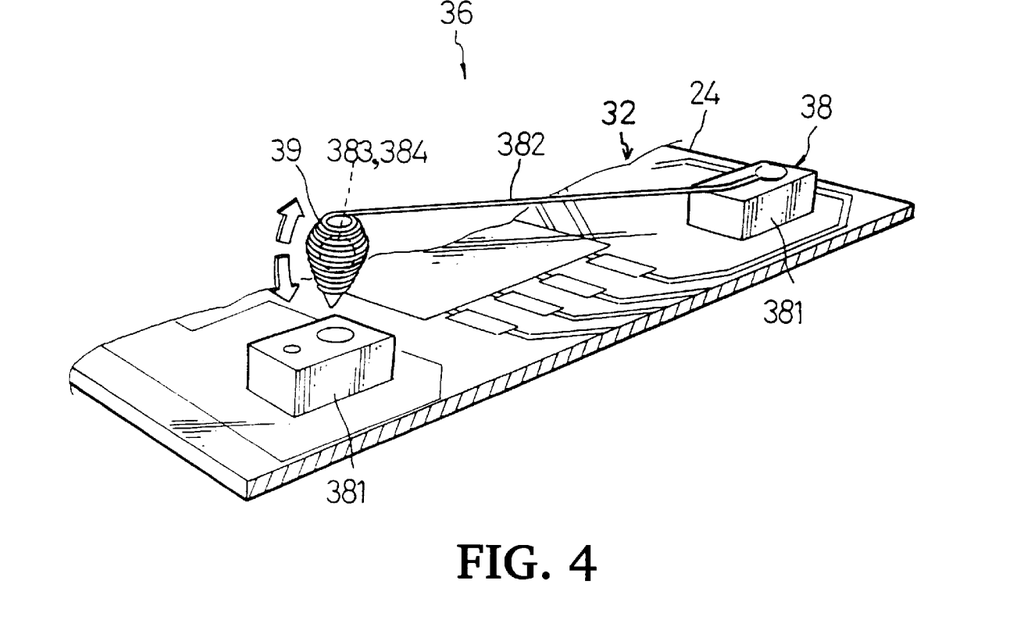
FIG. 4 is an enlarged view of a part of the first embodiment of the present invention, showing the arrangement of the power switch of the power supply circuit on the circuit board.

The shell 20 comprises a screw hole 21, that is threaded onto the threaded air valve 91 at an outer side of vehicle tire 90 and a needle 22 suspended in the screw hole 21. The needle 22 has an inlet 23. A circuit board 24 is mounted inside the shell 20. The tire pressure sensor and radio transmitter circuit 30 is mounted on the circuit board 24 to detect the pressure of the vehicle tire 90, and to send by radio transmission the detected tire pressure value to the radio receiver 11 and alarm circuit 12 which may be installed in the instrument panel of the motor vehicle as shown in FIG. 1B by radio.

Referring to FIGS. 1 through 4 again, the tire pressure sensor and radio transmitter circuit 30 is comprised of a tire pressure sensor 31, a tire pressure detector unit 32, a signal converter 33, an encoder 34, a radio modulator and transmitter unit 35, and a power supply circuit 36. The power supply circuit 36 comprises a power source 37, and a power switch 38. The power source can be a lithium battery or mercury battery connected between two metal plates 371 at the circuit board 24. The power switch 38 comprises two metal contacts 381, 381', a spring member 382, and a weight 383. The metal contacts 381, 381', are respectively connected to the positive and negative terminals of the power source 37. The spring member 382 is made of a steel wire, and can be oscillated in the direction of the centrifugal force produced upon rotary motion of the tire 90, having a fixed end connected to one metal contact 381 and a free end spaced from the other metal contact 381' at a distance. The weight 383 is fastened to the free end of the spring member 382. According to the first embodiment of the present invention, the weight 383 is a metal ball 384 mounted in a fixed manner in a metal coil spring 39, which is integral with the free end of the spring member 382. When the revolving speed of the tire 90 reaches a predetermined level, a centrifugal force is produced to force the free end of the spring member 382 having weight 383, into contact with metal contact 381', causing the positive and negative terminals of the power source 37 to be electrically connected, and automatically turning on the power supply circuit 36 is turned on automatically. When the power supply circuit 36 is turned on, the tire pressure sensor and radio transmitter circuit 30 detects the pressure of the tire 90 and sends the detected tire pressure value to the radio receiver 11 and alarm circuit 12 by radio transmission signals.

Figure 5:
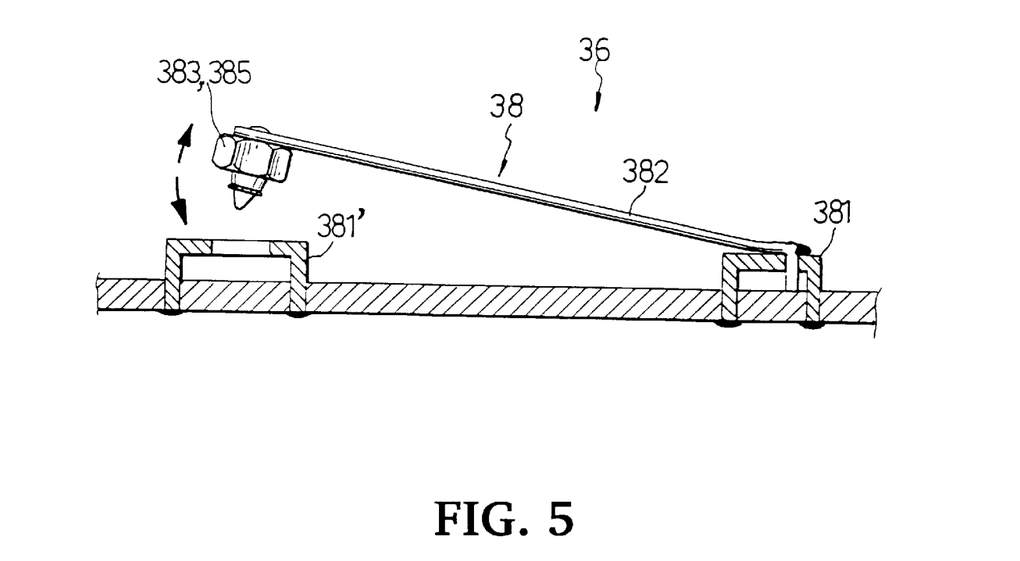
FIG. 5 is a sectional view in an enlarged scale of a part of a second embodiment of the present invention, showing the arrangement of the power switch on the circuit board.

FIG. 5 shows a second embodiment of the present invention. According to this embodiment, the weight 383 of the power switch (38 of the power supply circuit 36) is a metal nut 385 connected in a fixed manner to the free end of the spring member 382. Changing the type of weight 383 nut 385 used can easily control the amount of centrifugal force necessary to close/open the power switch 38 upon rotation of the tire 90.

Figure 6:
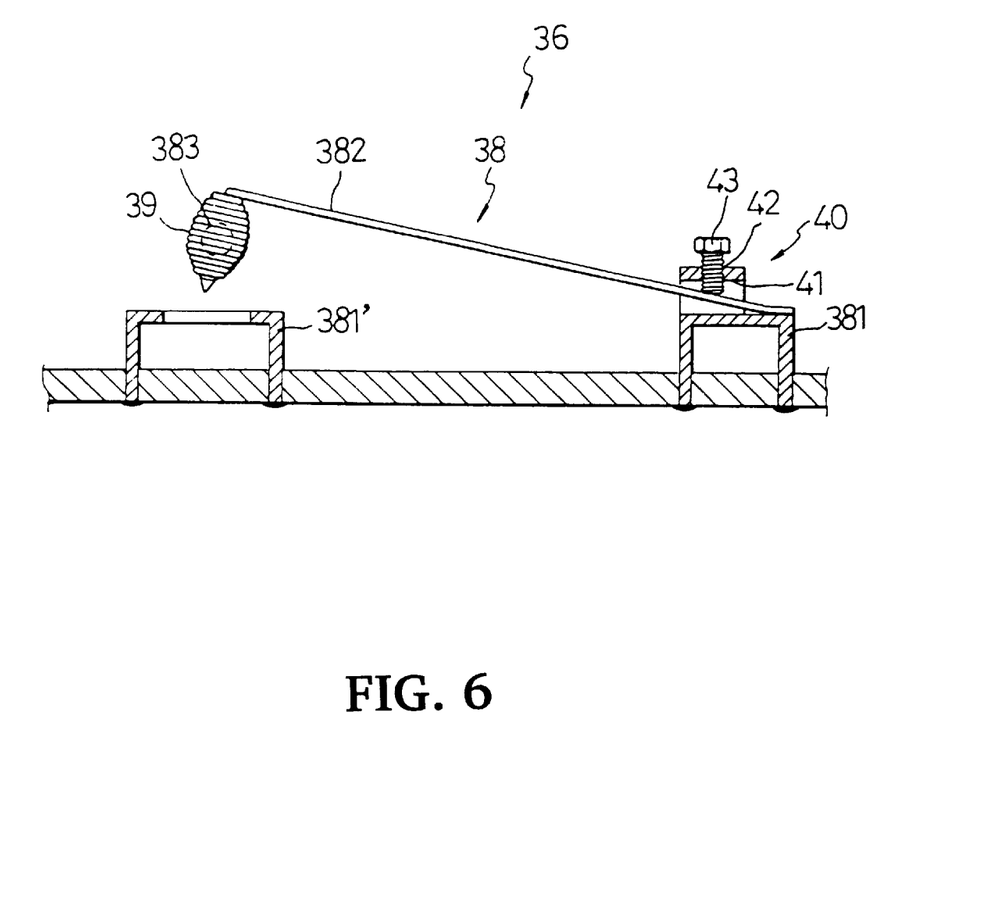
FIG. 6 is a sectional view in an enlarged scale of a part of a third embodiment of the present invention, showing the arrangement of the power switch on the circuit board.
Figure 7:
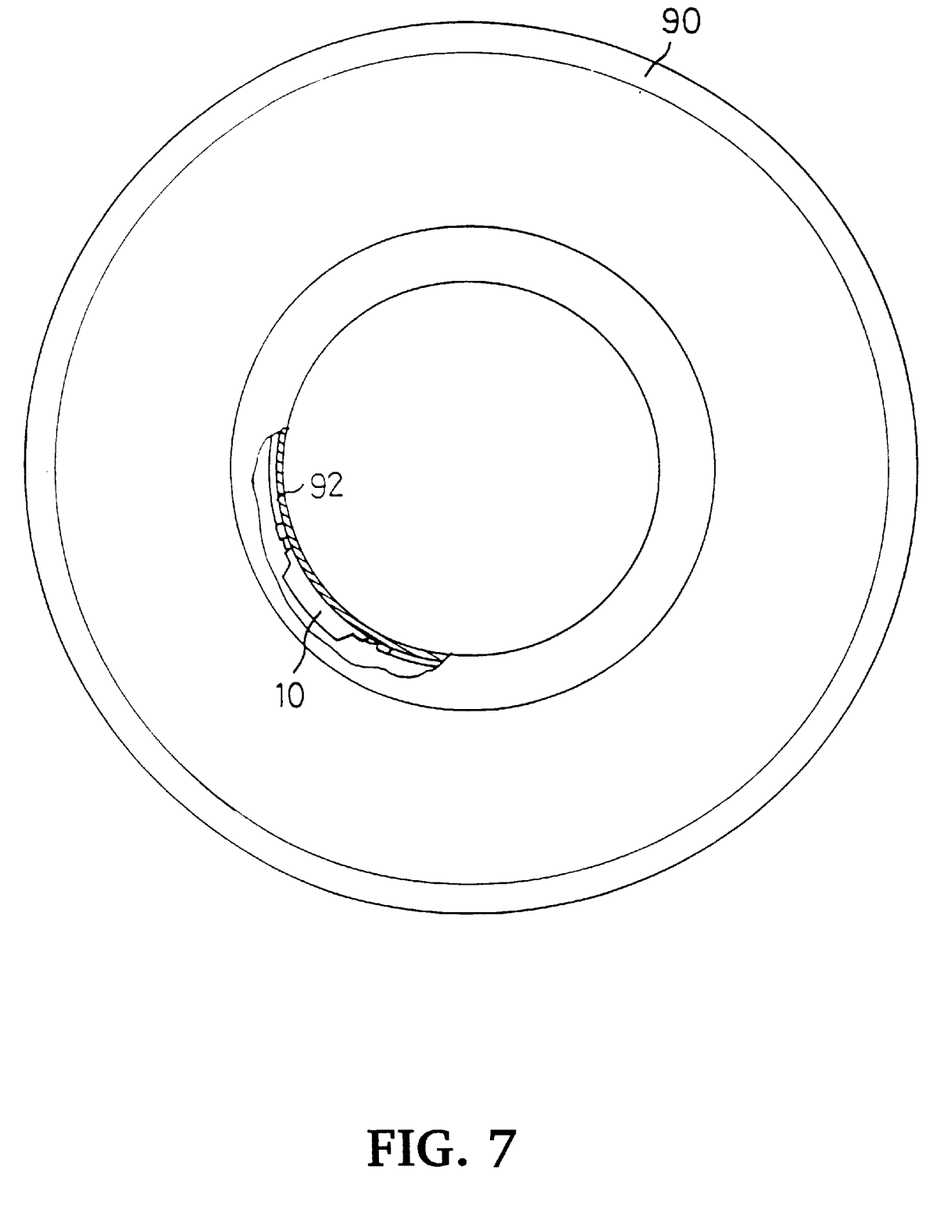
FIG. 7 illustrates the shell and tire pressure sensor and radio transmitter circuit of the tire pressure alarm system of the third embodiment of the present invention installed in the rim at an inner side of the tire.
Figure 8:
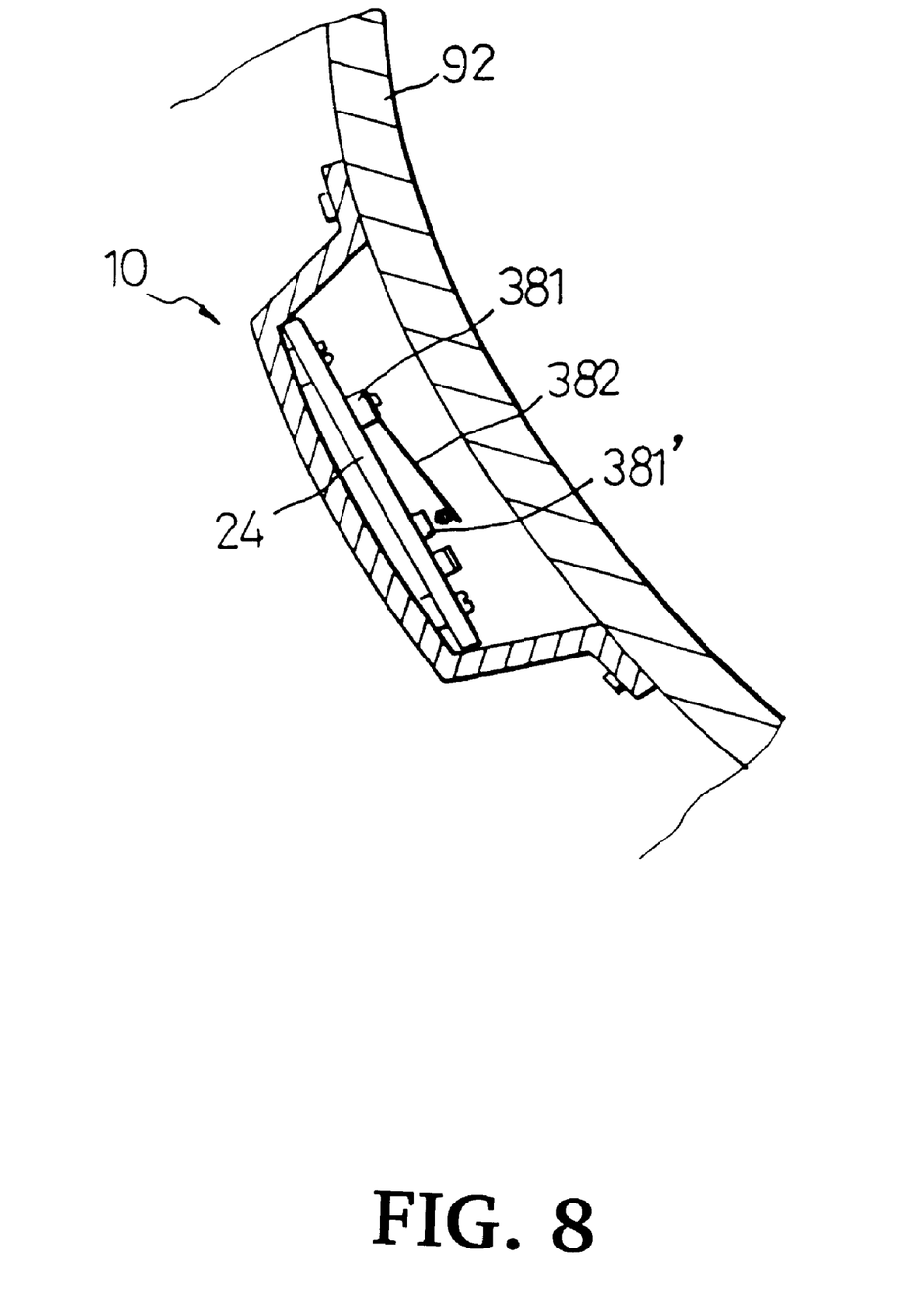
FIG. 8 is sectional view in an enlarged scale of a part of FIG. 7.

FIGS. 6, 7 and 8 shows a third embodiment of the present invention. According to the third embodiment, the tire pressure alarm system 10 is installed in the rim 92 at an inner side of the tire 90, and an adjustment mechanism 40 is provided for adjusting the sensitivity of the power supply circuit 36. The adjustment mechanism 40 comprises a shield 41 that partially covers metal contact 381 and the fixed end of the spring member 382. An adjustment screw 43 is threaded into a screw hole 42 at the shield 41 and is stopped by a part of the spring member 382. The sensitivity of the power switch 38 is adjusted by adjusting screw 43 upwards or downwards in the screw hole 42 to adjust the tilting angle of the spring member 382 at the metal contact 381 to which the fixed end of the spring member 382 is connected. The power switch 38 is then closed when a centrifugal force is produced upon rotary motion of the tire 90.

Figure 9:
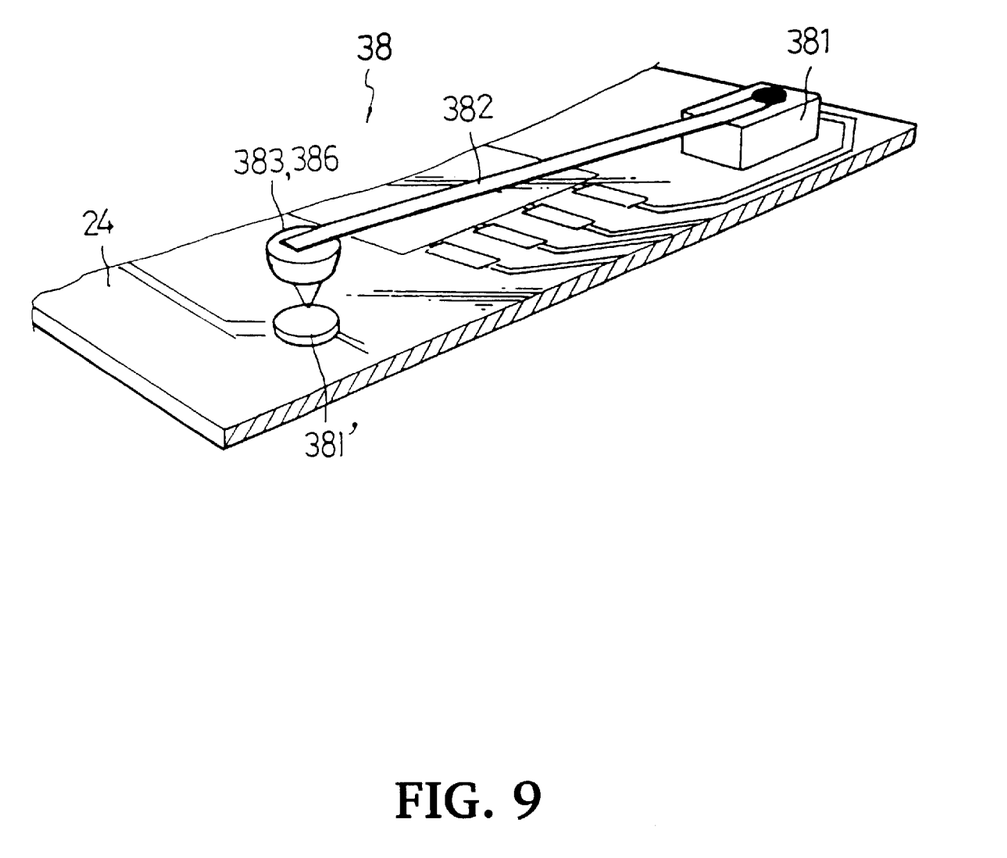
FIG. 9 is an elevational view in an enlarged scale of a part of a fourth embodiment of the present invention, showing the arrangement of the power switch on the circuit board.

FIG. 9 shows a fourth embodiment of the present invention. According to this embodiment, the tire pressure alarm system 10 is installed in the rim 92 at an inner side of the tire 90, the spring member 382 of the power switch 38 is an elongated spring strip, and the weight 383 is a metal element 386 welded to the free end of the elongated spring strip 382.

Figure 10:
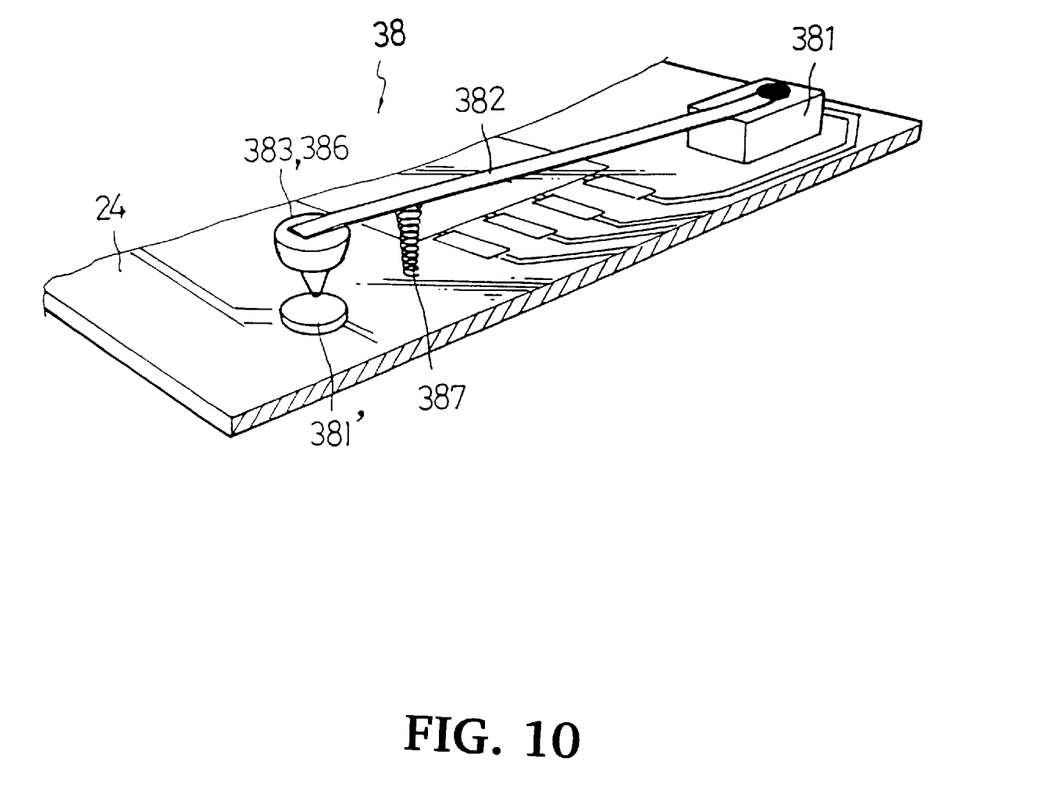
FIG. 10 is an elevational view in an enlarged scale of a part of a fifth embodiment of the present invention, showing the arrangement of the power switch on the circuit board.

FIG. 10 is a fifth embodiment of the present invention. This embodiment is similar to the arrangement of the aforesaid fourth embodiment, with the exception of the installation of a compression spring 387, which is connected between the free end of the elongated spring strip 382 and the circuit board 24. Normally, the compression spring 387 keeps the weight 383 (the metal element 386) away from the corresponding metal contact 381'. When the centrifugal force that is produced upon rotary motion of the tire overcomes the spring force of the compression spring 387, the weight 383 (metal element 386) is forced into contact with the corresponding metal contact 381', causing the power switch 38 to be switched on automatically.

Figure 11:
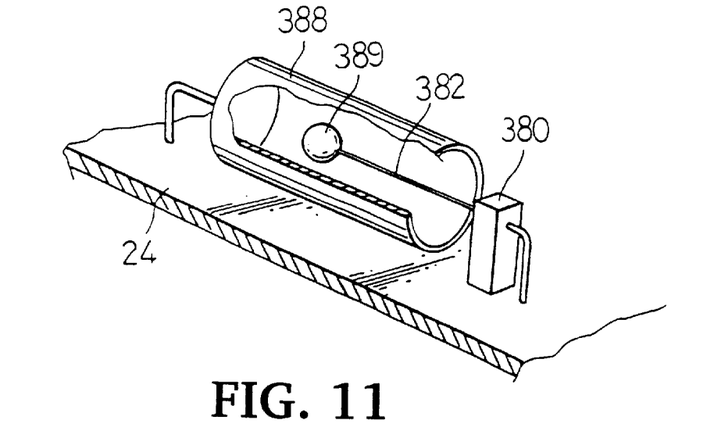
FIG. 11 is an elevational view in an enlarged scale of a part of a sixth embodiment of the present invention, showing the arrangement of the power switch on the circuit board.

FIG. 11 shows a sixth embodiment of the present invention. According to this embodiment, the first metal contact is shaped like a cylindrical tube 388 fixed on the circuit board 24. The metal spring member 382 supported by an isolator 380 has a weight 389 welded in it's end. The metal spring member 382 and weight 389 both are suspended inside the cylindrical tube 388 in order to obtain a 360 degree sensitivity.

Figure 12:
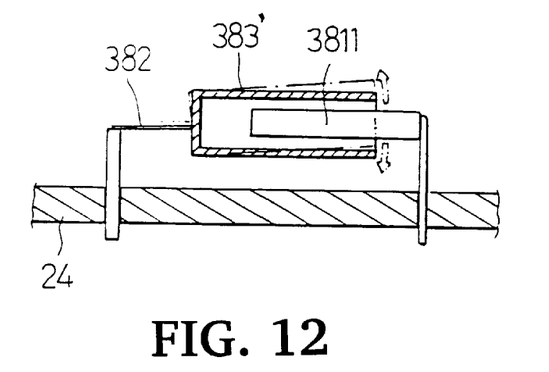
FIG. 12 is a sectional view of a part of a seventh embodiment of the present invention, showing the arrangement of the power switch on the circuit board.
Figure 13:
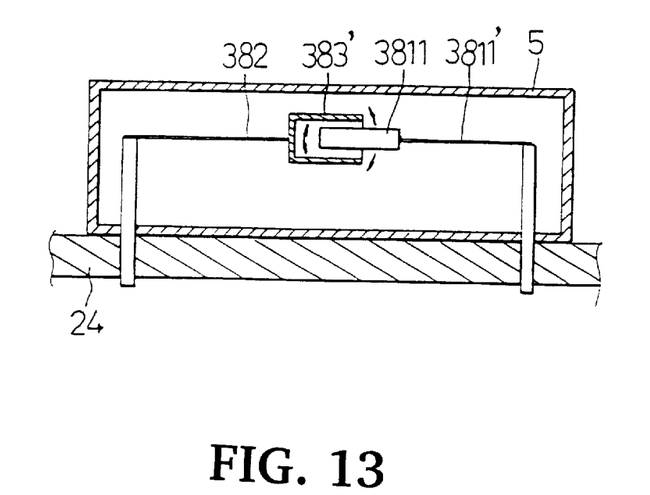
FIG. 13 is a sectional view of a part of an eighth embodiment of the present invention, showing the arrangement of the power switch on the circuit board.

FIGS. 12 and 13 show another two embodiments of the present invention. According to these embodiments, the weight 383' welded in the end of the metal spring member 382 is shaped like a hollow tube. The metal contact 3811 is installed inside the tube so as to contact with the vibrating weight 383'.

FIG. 13 shows the metal contact 3811 further suspended by another spring member 3811' to increase the sensitivity of vibration. In addition, FIG. 13 shows a cover 5 mounted outside the hollow tube weight 383' to prevent dust from contaminating the power switch 36.

It is to be understood that the drawings are designed for purposes of illustration only, and are not intended as a definition of the limits and scope of the invention disclosed.

What the invention claimed is:

1. A tire pressure alarm system comprising a tire pressure sensor and radio transmitter circuit mounted on a circuit board and installed in a tire to detect the pressure of the tire, and to send the detected tire pressure value to a radio receiver and alarm circuit by radio, and a radio receiver and alarm circuit adapted to receive the detected tire pressure value, wherein:

said tire pressure sensor and radio transmitter circuit comprises a power supply circuit, said power supply circuit comprising a power source, and a power switch, said power switch comprising a first metal contact and a second metal contact respectively connected to positive and negative terminals of said power source, a metal spring member having a fixed end connected to said first metal contact and a free end spaced from said second metal contact at a distance, and a weight connected to the free end of said metal spring member; when said tire is rotated at a speed over a predetermined level, a centrifugal force is produced and acted at said weight, and the free end of said metal spring member is forced by said centrifugal force to turn with said weight in one direction and to contact said second metal contact, causing said power switch to be switched on for enabling said tire pressure sensor and radio transmitter circuit to detect the tire pressure of said tire and to send the detected tire pressure value to said radio receiver and alarm circuit by radio.

2. The tire pressure alarm system of claim 1 further comprising a shell connected to the air valve of said tire to guide the tire pressure of said tire to said tire pressure sensor and radio transmitter circuit.

3. The tire pressure alarm system of claim 1 wherein said tire pressure sensor and radio transmitter circuit is installed in a rim at an inner side of the tire.

4. The tire pressure alarm system of claim 1 wherein said weight is an electrically conductive metal member.

5. The tire pressure alarm system of claim 4 wherein said electrically conductive metal member is shaped like a ball.

6. The tire pressure alarm system of claim 4 wherein said electrically conductive metal member is a metal nut.

7. The tire pressure alarm system of claim 1 wherein said power switch further comprises adjustment means controlled to adjust the tilting angle of said metal spring member.

8. The tire pressure alarm system of claim 7 wherein said adjustment means comprising a shield having a screw hole, and an adjustment screw threaded in the screw hole on said shield and pressed on said metal spring member at a top side.

9. The tire pressure alarm system of claim 1 wherein said power switch further comprising a compression spring connected between the free end of said metal spring member and said circuit board to keep the free end of said metal spring member away from said second metal contact, and to let the free end of said metal spring member contact said second metal contact when the centrifugal force which is produced upon rotary motion of the tire conquers the spring force of said compression spring.

10. The tire pressure alarm system of claim 1 wherein said first metal contact is a hollow unit, and said metal spring member suspended inside said hollow unit.

11. The tire pressure alarm system of claim 1 wherein said weight is a hollow unit, and said second metal contact extends inside said hollow unit.

12. The tire pressure alarm system of claim 1 wherein said second metal contact is suspended by a spring member.

13. The tire pressure alarm system of claim 1 further comprising a cover mounted outside said first and second metal contact.

* * * * *